United States Patent
Smed (10) Patent No.: US 8,800,944 B2
(45) Date of Patent: *Aug. 12, 2014

(54) TELESCOPING ASSEMBLY FOR A CPU HOLDER

(71) Applicant: Ole Falk Smed, Calgary (CA)

(72) Inventor: Ole Falk Smed, Calgary (CA)

( * ) Notice: Subject to any disclaimer, the term of this patent is extended or adjusted under 35 U.S.C. 154(b) by 2 days.

This patent is subject to a terminal disclaimer.

(21) Appl. No.: 13/950,971

(22) Filed: Jul. 25, 2013

(65) Prior Publication Data

US 2013/0306817 A1  Nov. 21, 2013

Related U.S. Application Data (63) Continuation of application No. 12/910,635, filed on Oct. 22, 2010, now Pat. No. 8,500,077.

(51) Int. Cl.
| | | |
|---|---|---|
| *A47B 11/00* | (2006.01) | |
| *A47H 1/00* | (2006.01) | |
| *E04G 3/00* | (2006.01) | |
| *A47B 21/03* | (2006.01) | |
| *F21V 21/22* | (2006.01) | |
| *A47B 88/04* | (2006.01) | |

(52) U.S. Cl.
CPC ............. *A47B 21/03* (2013.01); *F21V 21/22* (2013.01); *A47B 88/04* (2013.01)
USPC ............ 248/298.1; 248/317; 248/285.1; 108/140; 108/143

(58) Field of Classification Search
CPC ........ A47B 11/00; A47B 21/03; A47B 88/04; A47B 88/0407; F21V 21/22
USPC ........... 248/317, 285.1, 917, 918, 225.1, 429, 248/224.8, 205.1, 298.1; 108/137–140, 143
See application file for complete search history.

(56) References Cited

U.S. PATENT DOCUMENTS

| | | | | |
|---|---|---|---|---|
| 2,293,168 | A | * | 8/1942 | Pirone ........................ 211/123 |
| 4,079,604 | A | | 3/1978 | Anderegg |
| 5,131,620 | A | * | 7/1992 | Boundy ........................ 248/674 |
| 5,681,116 | A | * | 10/1997 | Lin ................................ 384/42 |
| 5,779,206 | A | | 7/1998 | Harris et al. |
| 6,098,944 | A | | 8/2000 | Pangborn et al. |
| 6,402,111 | B1 | * | 6/2002 | Stewart et al. ............... 248/317 |
| 6,409,127 | B1 | * | 6/2002 | VanderHeide et al. ....... 248/118 |
| 6,460,817 | B1 | | 10/2002 | Bosson |
| 6,484,979 | B1 | * | 11/2002 | Medlin, Jr. ................ 248/205.1 |
| 6,969,792 | B2 | | 11/2005 | Wang |
| 6,986,411 | B2 | | 1/2006 | Schautt et al. |
| 6,986,491 | B2 | * | 1/2006 | Anderson .................... 248/317 |
| 7,841,570 | B2 | | 11/2010 | Mileos et al. |
| 8,215,597 | B1 | * | 7/2012 | Medlin et al. ............. 248/205.1 |
| 8,500,077 | B2 | * | 8/2013 | Smed ........................... 248/317 |

\* cited by examiner

*Primary Examiner* — Tan Le
(74) *Attorney, Agent, or Firm* — Carl A. Hjort, III (57) ABSTRACT

A telescoping assembly for use with a CPU holder including a mounting track with mounting holes for securing the mounting track to the underside of a generally horizontal surface such as a desk; runners disposed in the mounting track; a telescoping track, adapted for insertion into the mounting track and to engage with the runners therein; a pivoting member, adapted for engagement with the telescoping track and to engage with a CPU holder, the pivoting member comprising a track engagement member and a CPU holder engagement member being joined for 360° rotation about a vertical axis therethrough; and wherein the telescoping track is adapted for translation along the mounting track from a retracted position to an extended position, and when the telescoping track is in the extended position a CPU retained in the CPU holder is positioned past the edge of the generally horizontal surface.

10 Claims, 8 Drawing Sheets

TELESCOPING ASSEMBLY FOR A CPU HOLDER

CROSS REFERENCE TO RELATED APPLICATION

The present application is a continuation of U.S. application Ser. No. 12/910,635, filed Oct. 22, 2010, now U.S. Pat. No. 8,500,077, having the same title, which is incorporated herein by this reference.

DETAILED DESCRIPTION OF THE DRAWINGS

Embodiments of a telescoping assembly for a CPU holder are shown and described. Generally, the telescoping assembly comprises a mounting track with mounting holes for securing the mounting track to the underside of a generally horizontal surface such as a desk; runners disposed in the mounting track; a telescoping track, adapted for insertion into the mounting track and to engage with the runners disposed therein; a pivoting member, made for engagement with the telescoping track and for engagement with a CPU holder, and capable of 360° rotation about a vertical axis therethrough; and further that the telescoping track is adapted for translation along the mounting track from a retracted position to an extended position, and when the telescoping track is in the extended position, the pivoting member and the CPU holder are in a position substantially past the edge of the desk surface, and a CPU retained in the CPU holder is positioned past the edge of the desk surface.

Figure 1:
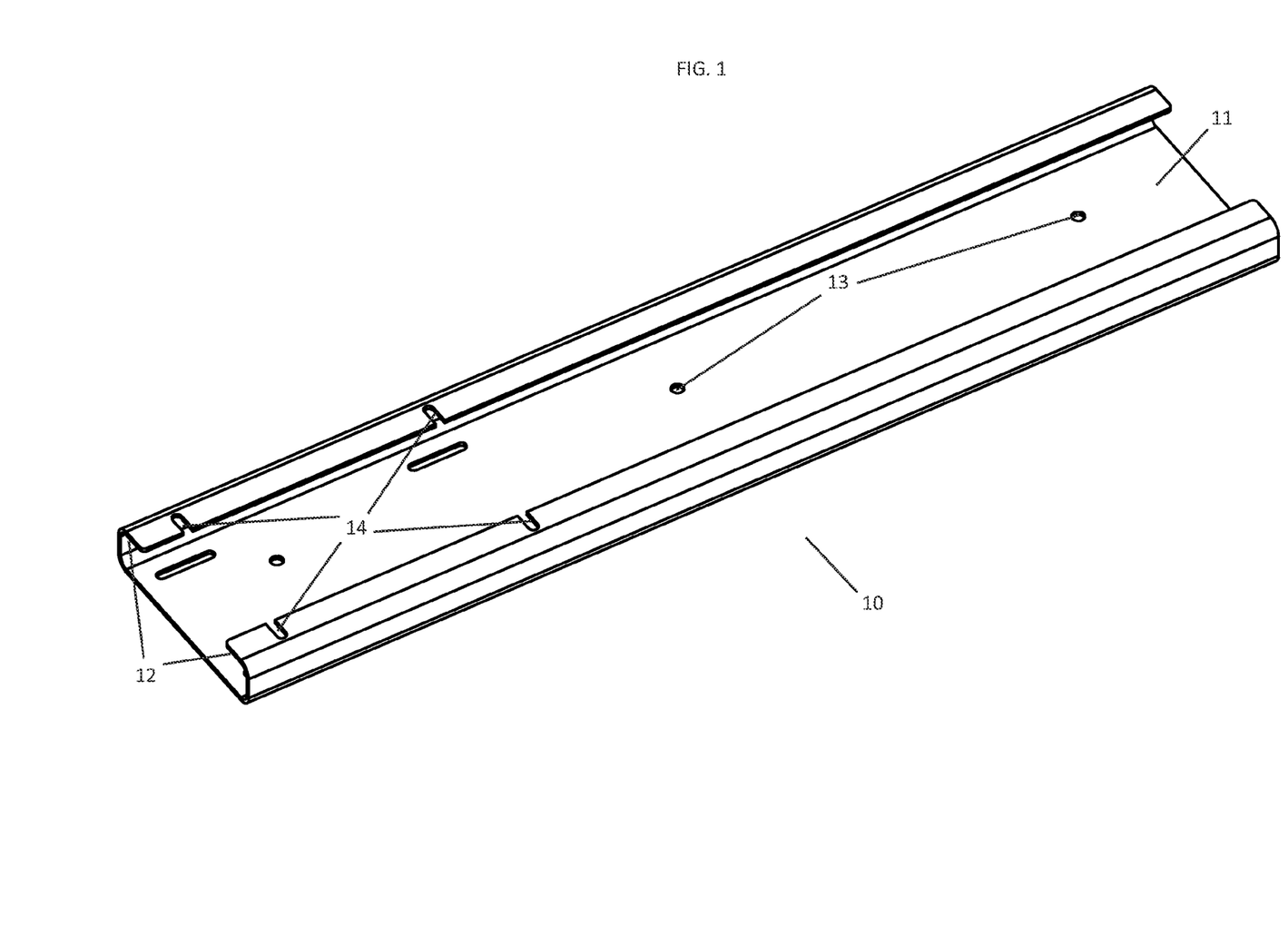
FIG. 1 is a perspective view of a mounting track for a telescoping assembly for a CPU holder.

FIG. 1 shows a perspective view of an embodiment of the mounting track 10 for a telescoping assembly for a CPU holder. Mounting track 10 is generally comprised of base member 11, and channel forming members 12. As illustrated in FIG. 1, mounting track 10 has a generally c-shaped cross-section. One of ordinary skill in the art will readily appreciate that mounting track 10 can be formed from a single piece of material, or could be formed from multiple pieces of material joined together in any manner commonly used in the art. Mounting track 10 can be made of steel, aluminum, other metals or plastics. It should also be appreciated that FIG. 1 shows the mounting track 10 from the bottom. That is, the opposite side of the illustrated base member surface 11 is mated with the underside of the desk or other generally flat surface to which mounting track 10 is to be mounted. In that way, channel forming members 12 hang down from the underside of the desk surface, and are capable of receiving the telescoping track, in a manner which will be discussed in greater detail infra. Also shown in FIG. 1 are mounting holes 13. Mounting holes 13 allow for the securing of mounting track 10 to the underside of a desk or other generally flat surface in the manner discussed above. One of ordinary skill in the art will appreciate that mounting holes 13 are sized to receive standard fasteners adequate for securing the telescoping assembly and CPU holder to the underside a desk or similar surface. FIG. 1 also shows runner engagement slots 14. As will be explained in greater detail with reference to the exploded view shown in FIG. 3, runner engagement slots 14 engage with and retain runners in the mounting track.

Figure 2:
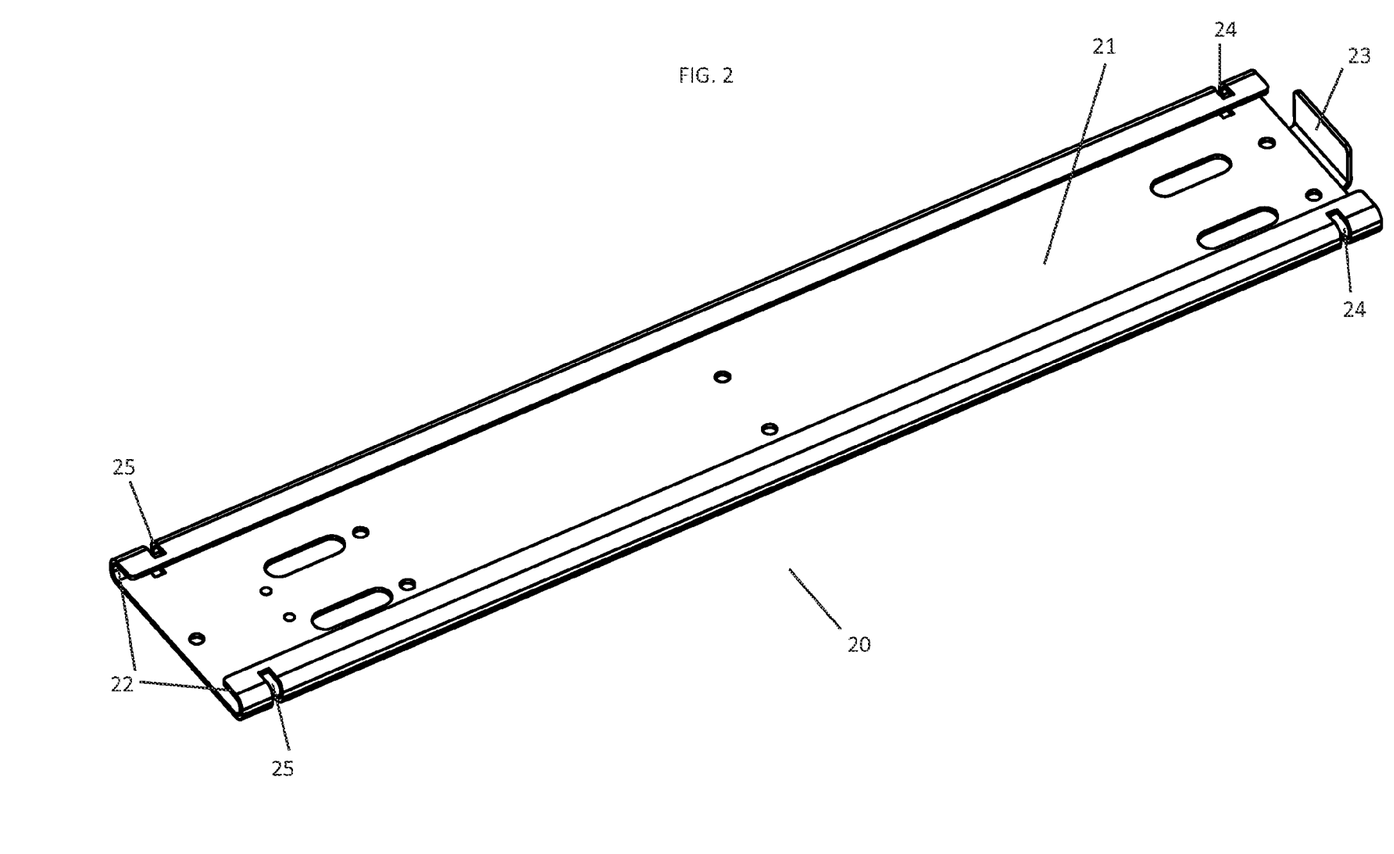
FIG. 2 is a perspective view of a telescoping track for a telescoping assembly for a CPU holder.

FIG. 2 shows a perspective view of an embodiment of the telescoping track 20 for a telescoping assembly for a CPU holder. Generally, telescoping track 20 has a similar shape to mounting track 10, however telescoping track 20 has smaller dimensions than mounting track 10, such that telescoping track 20 may be inserted into mounting track 10, and telescoping track 20 may translate along mounting track 10. Telescoping track 20 is generally comprised of flat base surface 21 and channel forming members 22. As illustrated in FIG. 2, telescoping track 20 has a generally c-shaped cross-section. One of ordinary skill in the art will readily appreciate that telescoping track 20 can be formed from a single piece of material, or could be formed from multiple pieces of material joined together in any manner commonly used in the art. Telescoping track 20 can be made of steel, aluminum, other metals or plastics. It should also be appreciated that FIG. 2 shows the telescoping track 20 from the bottom. That is, telescoping track 20 is inserted into the mounting track with the opposite side of illustrated base member surface 21 disposed upwardly. In that way, channel forming members 22 are disposed in a downward facing direction, and are capable of receiving the pivoting member, in a manner which will be discussed in greater detail infra. Also shown in FIG. 2 is stop member 23. Stop member 23 may be formed integral to telescoping track 20 or it may be formed separately and joined to telescoping track 20 by any method known in the art. Stop member 23 functions to prevent the pivot member from coming out of the tracks created by channel forming members 22. Telescoping track 20 also has runner retention slots 24 disposed thereon. Runner retention slots 24 allow for additional runners to be retained on the telescoping track. Telescoping track 20 also has end cap retention slots 25 disposed thereon. End cap retention slots 25 serve as engagement points for the end cap, which will be described more completely in relation to the exploded view in FIG. 3.

Figure 3:
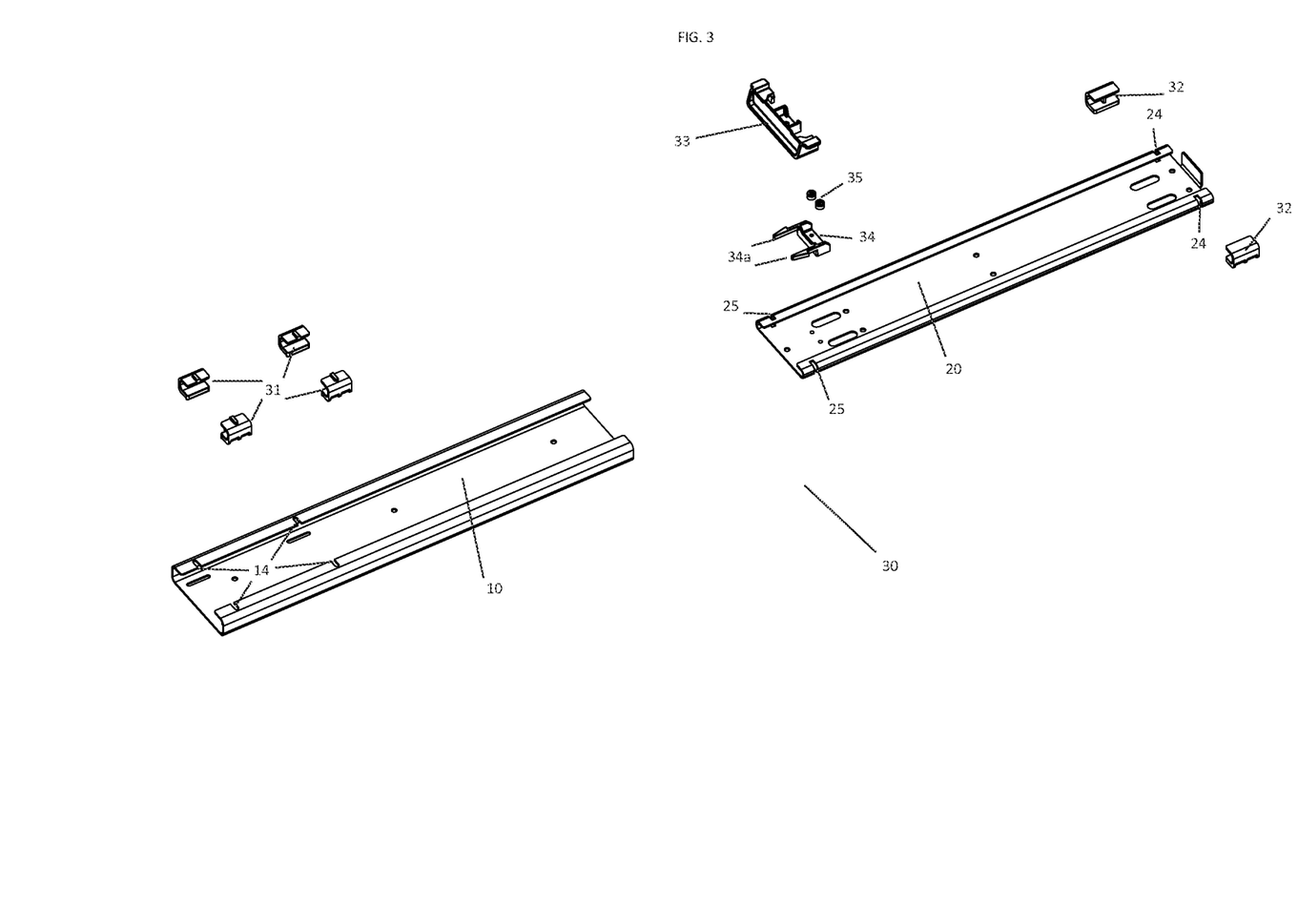
FIG. 3 is an exploded view showing the assembly of the mounting track and the telescoping track.

FIG. 3 shows an exploded view of the assembly 30 of the mounting track 10 and the telescoping track 20. The features of both the mounting track 10 and the telescoping track 20 are shown with numerals corresponding to the numerals used in relation to FIGS. 1 and 2. FIG. 3 shows additional components such as mounting track runners 31. Mounting track runners 31 are retained in runner engagement slots 14 on mounting track 10. Mounting track runners 31 facilitate the translation of the telescoping track within the mounting track by functioning as low-friction bearing surfaces for telescoping track 20. Also shown in FIG. 3 are telescoping track runners 32. Telescoping track runners 32 are retained in runner retention slots 24 on the telescoping track 20. Telescoping track runners 32 perform the same function as mounting track runners 31, i.e. they provide a low-friction bearing surface to facilitate the translation of telescoping track 20 along mounting track 10. Telescoping track runners 32 also perform the additional function of acting as a stop to prevent telescoping track 20 from being pulled entirely out of engagement with mounting track 10. If a user slides telescoping track 20 forward in relation to mounting track 10, telescoping track runners 32 will eventually make contact with mounting track runners 31 and further progress of the telescoping track in the forward direction will then be impeded. End cap 33 is also shown in FIG. 3. End cap 33 engages with end cap retention slots 25 on telescoping track 20. End cap 33 may be removable from the end of telescoping track 20. If a user desires to remove the pivoting member from telescoping track 20, which will be discussed in greater detail below, then end cap 33 must be removed from the end of telescoping track 20 to allow for the removal of the pivoting member. End cap 33 may also be fixed in place in alternate embodiments. Release member 34 is also shown in FIG. 3. Release member 34 is adapted to retain the pivoting member in engagement with the telescoping track. Release member 34 is also adapted to release the pivoting member from engagement with the telescoping track upon compression by a user. Release member 34 has flexible fingers 34a, which in their uncompressed state obstruct pivoting member from being able to slide out of engagement with telescoping track 20. Flexible fingers 34a may be compressed by a user to allow the pivoting member to slide out of engagement with telescoping track 20. Thus, to remove the pivoting member from the telescoping track, a user first removes the end cap 33 from engagement with the telescoping track 20, then compresses the release member 34 and slides the pivoting member out from engagement with the telescoping track 20. Release member 34 may be secured to telescoping track 20 by way of screws 35 or any other fastener or method of fastening known in the art.

Figure 4:
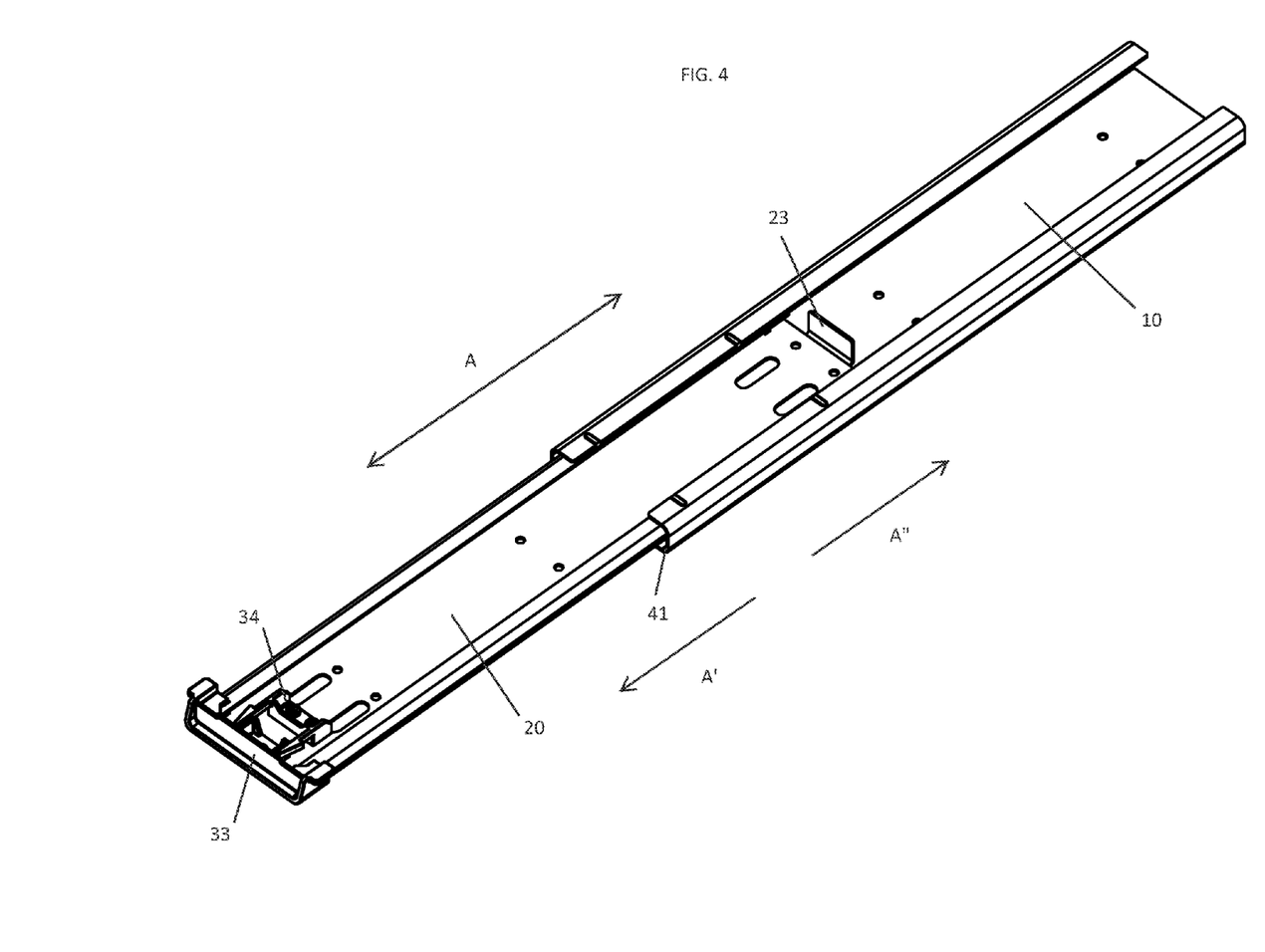
FIG. 4 is a perspective view of the assembly of the mounting track and the telescoping track.

FIG. 4 shows an assembled view of the mounting track 10 and telescoping track 20. The features of the mounting track 10, the telescoping track 20 and the assembly thereof 30 are shown with numerals corresponding to the numerals used in relation to FIGS. 1 through 3. The assembled view of FIG. 4 shows the telescoping track 20 in engagement with the mounting track 10. Stop member 23, end cap 33 and release member 34 are all shown disposed on telescoping track 20. It should be appreciated that FIG. 4 shows a bottom view of the assembly and that when the assembly is installed on the underside of a desk or similar surface, the features shown in FIG. 4 will be oriented in a downward direction, rather than in an upward direction as depicted in FIG. 4.

It should also be appreciated that telescoping track 20 is able to slidably translate in either direction along axis A marked in FIG. 4. Telescoping track 20 may translate in the direction A" shown in FIG. 4 and may slidably engage with the mounting track 10 to such an extent that telescoping track 20 is completely retained in mounting track 10. End cap 33 may act as a stop to prevent the telescoping track from further translation into the mounting track when end cap 33 makes contact with the front edge 41 of the mounting track 10. Other mechanisms for stopping further translation of the telescoping track into the mounting track will be readily apparent to those skilled in the art. When telescoping track 20 is moved completely in the direction A" and fully retained in the mounting track 10, telescoping track 20 is said to be in the inserted or retracted position. When the telescoping assembly is mounted on the underside of a desk or similar structure, and when telescoping track 20 is in the inserted or retracted position, telescoping track 20 is in a position in the area under the desk and does not substantially protrude past the edge of the desk.

Alternatively, telescoping track 20 may translate in the direction A' shown in FIG. 4. Telescoping track 20 may translate in the direction A' to such an extent that telescoping track runners make contact with the mounting track runners, as described in relation to FIG. 3. In such a case, telescoping track runners act as a stop to prevent telescoping track from further translation, and prevent telescoping track 20 from being pulled completely out of engagement with mounting track 10. Other mechanisms for stopping further translation of the telescoping track out of the mounting track will be readily apparent to those skilled in the art. When telescoping track 20 is moved as far in the direction A' as permitted by any stop mechanism, telescoping track 20 is said to be in the withdrawn or extended position. When the telescoping assembly is mounted on the underside of a desk or similar structure, and when telescoping track 20 is in the withdrawn or extended position, telescoping track 20 substantially protrudes past the edge of the desk or similar structure.

Figure 5:
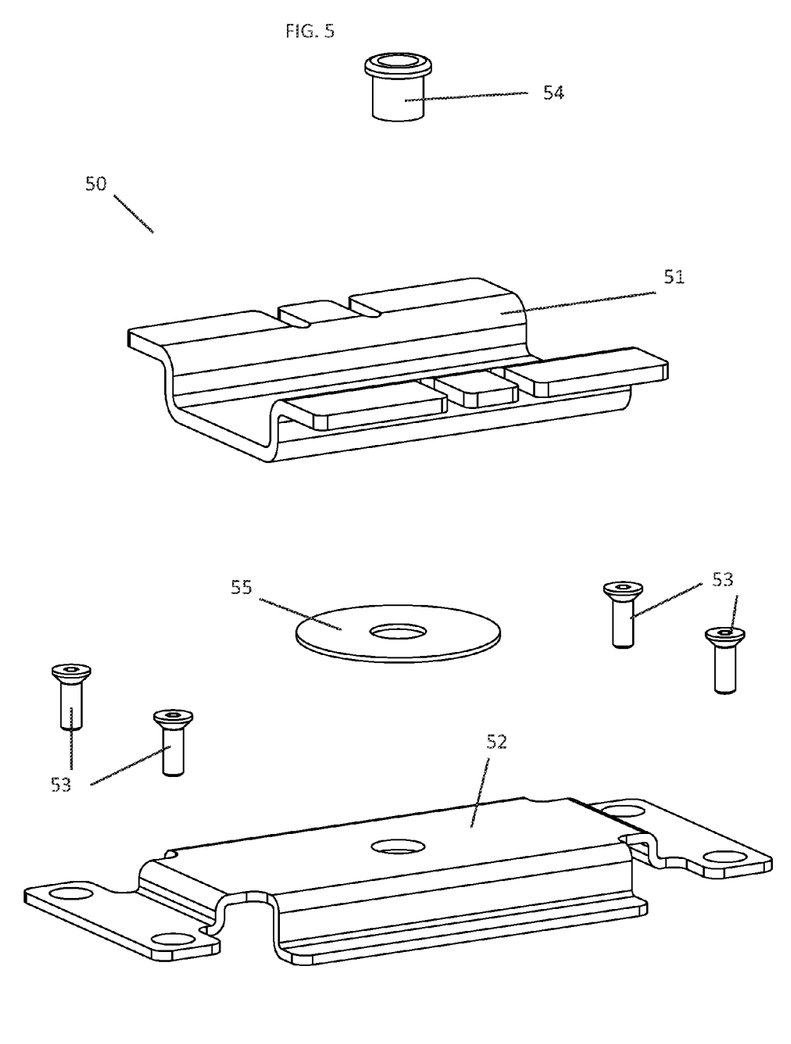
FIG. 5 is an exploded view of a pivoting member for use with the telescoping assembly for a CPU holder.

FIG. 5 shows an exploded view of a pivoting member 50 for use with the telescoping assembly. The pivoting member 50 comprises a track engagement member 51 and a CPU holder engagement member 52. Track engagement member 51 is sized and dimensioned to engage with the channel forming members of the telescoping track. CPU holder engagement member 52 is adapted to engage with a CPU holder. CPU holder engagement member 52 may engage with the CPU holder by way of fasteners 53 shown in FIG. 5 or by other fasteners or methods of fastening known in the art. The track engagement member 51 and CPU holder engagement member 52 are joined for 360° rotation about a vertical axis therethrough. More particularly, washer 55 may be disposed between track engagement member 51 and CPU holder engagement member 52 and then track engagement member 51 and CPU holder engagement member 52 may be joined by rivet 54 in such a way that track engagement member 51 and CPU holder engagement member 52 may rotate about the vertical axis therethrough. One of ordinary skill in the art will appreciate that any method of joining the track engagement member 51 and the CPU holder engagement member 52 may be employed as long as said method preserves the ability of those parts to rotate about their common vertical axis.

Figure 6:
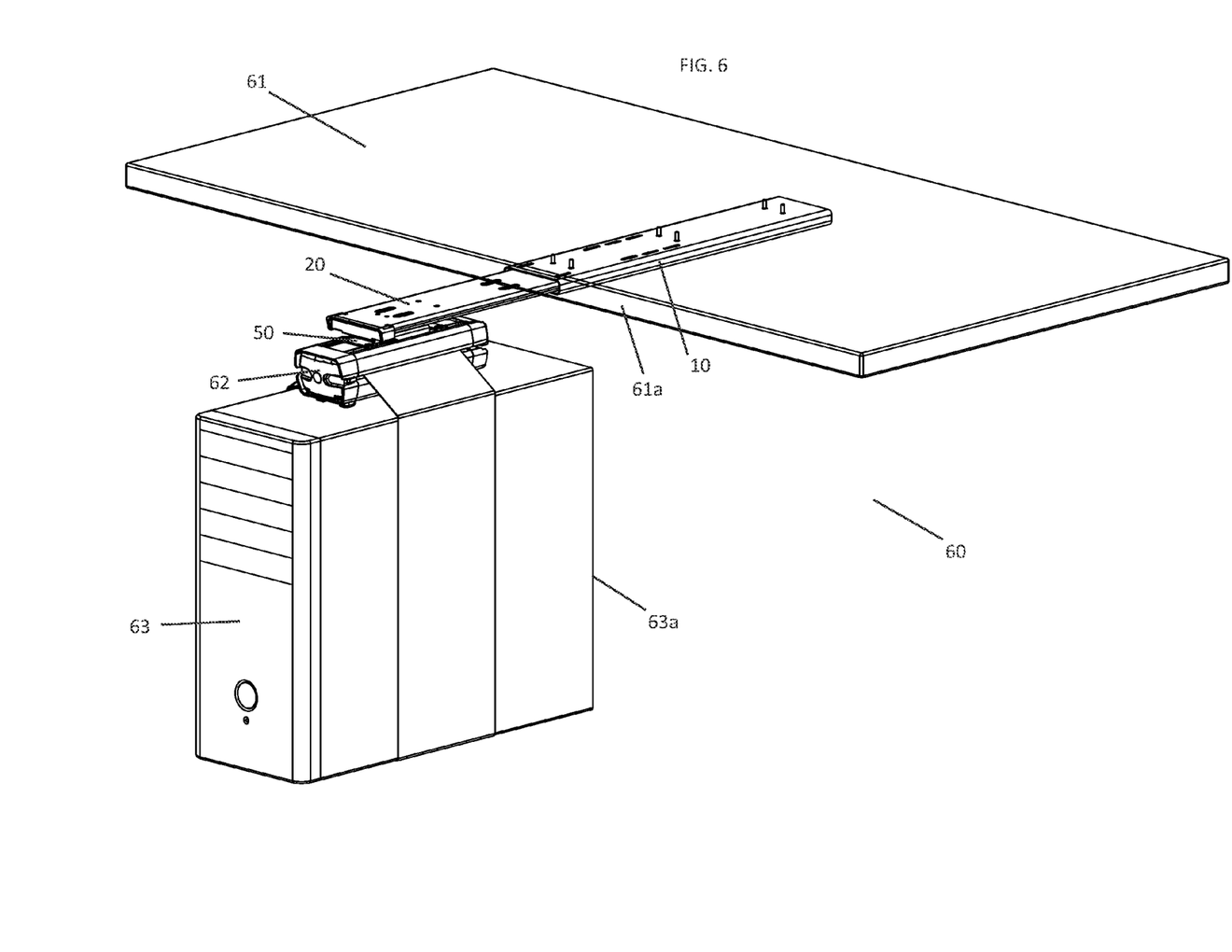
FIG. 6 is a perspective view of the entire telescoping assembly for a CPU holder, showing a CPU disposed therein.

FIG. 6 shows a perspective view of the entire telescoping assembly 60 for a CPU holder, showing a CPU disposed therein. As shown in FIG. 6, mounting track 10 is fastened to the underside of generally horizontal surface 61. Generally horizontal surface 61 may be a desk, table or similar surface. Surface 61 is shown as transparent in FIG. 6 to facilitate the viewing of mounting track 10. Telescoping track 20 is engaged with mounting track 10, and is in the withdrawn or extended position. That is to say, telescoping track 20 is withdrawn as far forward as permitted by the stop mechanism formed by the cooperation of the mounting track runners and the telescoping track runners, as that mechanism was described in relation to FIG. 3. Pivoting member 50 is engaged with telescoping track 20, and is also engaged with CPU holder 62. CPU 63 is disposed within CPU holder 62. As can be seen in FIG. 6, the rear edge 63a of CPU 63 is past the edge 61a of generally horizontal surface 61. In this way, the telescoping assembly allows the user to withdraw the CPU from under a desk surface for easy access to all sides of the CPU. When access to the CPU is not needed, telescoping track 20 may be translated into mounting track 10 to position the CPU under the desk and out of the way of the user.

Figure 7:
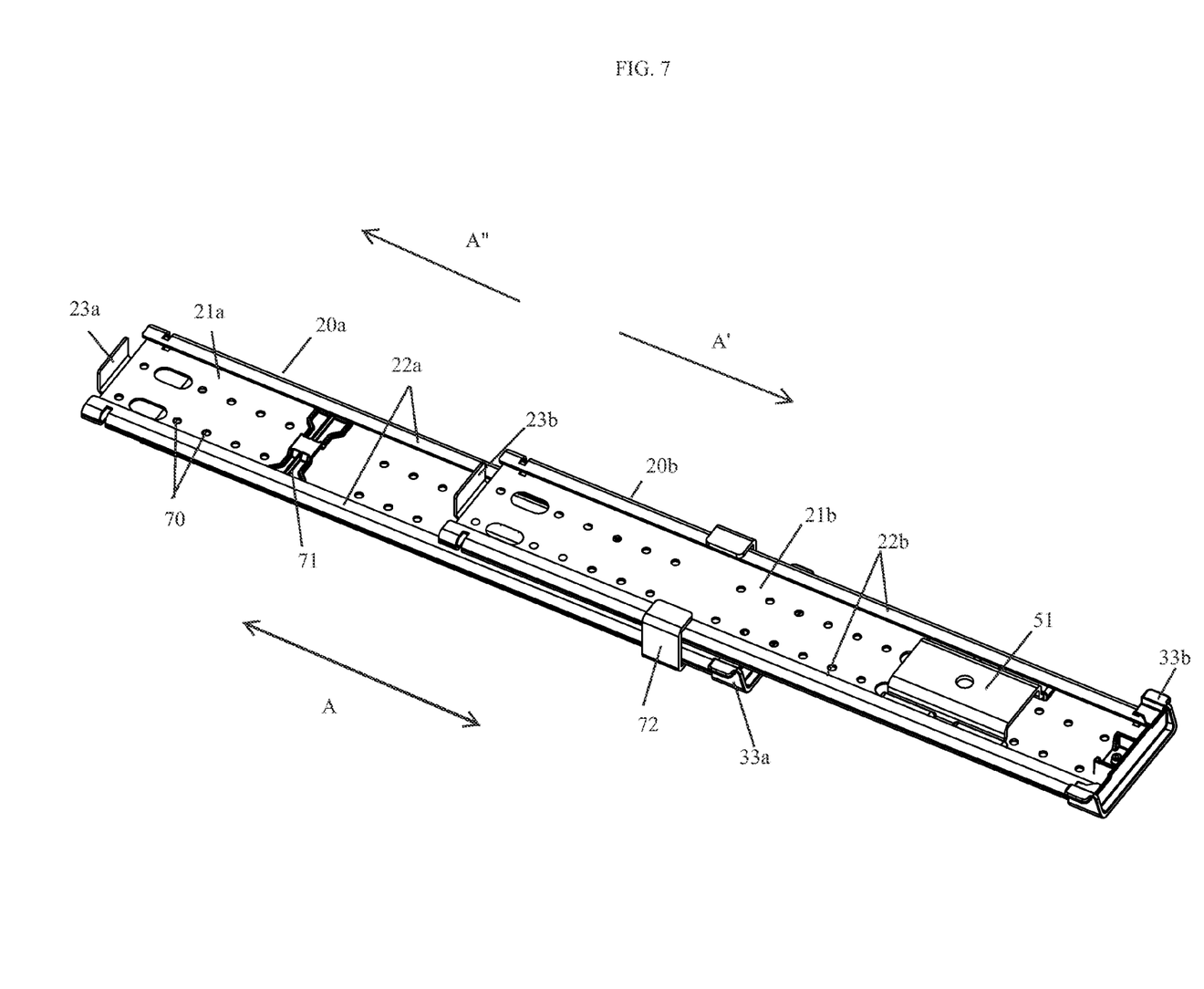
FIG. 7 is a perspective view of the assembly of an alternate embodiment for a telescoping assembly for a CPU holder.

FIG. 7 shows a perspective view of the assembly of an alternate embodiment for a telescoping assembly for a CPU holder. Like numerals will be used to identify components that have already been identified in relation to previous figures. In the alternative embodiment shown in FIG. 7, a single type of track member may be used. As shown in FIG. 7, the track takes the form of a telescoping track 20 which has been described supra. Two of the telescoping tracks 20a and 20b are provided. As shown in FIG. 7, the tracks 20a and 20b have a generally c-shaped cross-section. It will be appreciated by those skilled in the art that the telescoping tracks may take any form of shape or geometry so long as they are capable of the slidable engagement described herein. Additionally, one of ordinary skill in the art will readily appreciate that providing telescoping tracks 20*a* and 20*b* as having the same shape and geometry will simplify the manufacturing process because a single part can then be used interchangeably as either piece. However, this interchangability is not a requirement and in alternative embodiments the tracks provided as 20*a* and 20*b* may each have a different shape or geometry with respect to each other.

Mounting holes 70 are provided in tracks 20*a* and 20*b*. The mounting holes 70 serve no purpose in track 20*b* because that track slides freely and does not mount to any surface. In track 20*a*, however, the mounting holes 70 allow the track to be secured to the underside of a desk or other generally flat surface. In such a way, track 20*a* may be considered a stationary track, as it is fixed in place and does not move. It should also be appreciated that FIG. 7 shows tracks 20*a* and 20*b* from the bottom. That is, the opposite side of the illustrated base member surface 21 is mated with the underside of the desk or other generally flat surface to which track 20*a* is to be mounted. In that way, channel forming members 22*a* are disposed in a downward facing direction, and are capable of receiving the sliding engagement member, which will be discussed Infra. In that way, tracks 20*a* and 20*b* hang down from the underside of the desk surface in the same manner as the first embodiment shown in FIG. 6 does. One of ordinary skill in the art will appreciate that mounting holes 70 are sized to receive standard fasteners adequate for securing the track 20*a* to the underside of a desk or similar surface.

A track engagement member 51 is also provided. Track engagement member 51 is the same as described above with respect to FIG. 5. Track engagement member 51 is sized and dimensioned to engage with the channel forming members 22 of track 20*b*. The track engagement member 51 and a CPU holder engagement member (not shown) are joined for 360° rotation about a vertical axis therethrough. The assembly of the track engagement member 51 and the CPU holder engagement member forms a pivoting member equivalent to pivoting member 50 shown in FIG. 5.

Also shown in FIG. 7 are stop members 23*a* and 23*b*. Stop members 23*a* and 23*b* may be formed integral to tracks 20*a* and 20*b* or they may be formed separately and joined to tracks 20*a* and 20*b* by any method known in the art. Stop members 23*a* and 23*b* function to prevent the sliding engagement member and the pivot member from coming out of the tracks created by channel forming members 22*a* and 22*b*. Also provided is optional stop member 71. Optional stop member 71 serves to stop the sliding engagement of track 20*b* with respect to track 20*a*, when track 20*b* has been slid to a predetermined stop point. End caps 33*a* and 33*b* may also be provided. End caps 33*a* and 33*b* are the same as those described with respect to FIG. 3. End caps 33*a* and 33*b* may be removable or they may be permanently affixed to the track members. End caps 33*a* and 33*b* serve to prevent the sliding engagement member and the pivot member from coming out of engagement with the tracks created by channel forming members 22*a* and 22*b*.

It should also be appreciated that track 20*b* is able to slidably translate in either direction along axis A marked in FIG. 7. Track 20*b* may translate in the direction A″ shown in FIG. 7. Optional stop member 71 may act as a stop to prevent track 20*b* from further translation in direction A″ with respect to track 20*a* when sliding engagement member makes contact with optional stop member 71. Other mechanisms for stopping further translation of track 20*b* will be readily apparent to those skilled in the art. When track 20*b* is moved completely in the direction A″ such that optional stop member 71 impedes further translation in that direction, track 20*b* is said to be in the inserted or retracted position. When the telescoping assembly is mounted on the underside of a desk or similar structure, and when track 20*b* is in the inserted or retracted position, track 20*b* is in a position in the area under the desk and does not substantially protrude past the edge of the desk.

Alternatively, track 20*b* may translate in the direction A′ shown in FIG. 7. Track 20*b* may translate in the direction A′ to such an extent that the sliding engagement member makes contact with the end cap 33*a*. In such a case, end cap 33*a* acts as a stop to prevent track 20*b* from further translation, and prevent the sliding engagement member from being pulled completely out of engagement with track 20*a*. Other mechanisms for stopping further translation of the sliding engagement member out of track 20*a* will be readily apparent to those skilled in the art. When track 20*b* is moved as far in the direction A′ as permitted by end cap 33*a*, track 20*b* is said to be in the withdrawn or extended position. When the telescoping assembly is mounted on the underside of a desk or similar structure, and when track 20*b* is in the withdrawn or extended position, track 20*b* substantially protrudes past the edge of the desk or similar structure.

An anti-cocking bracket 72 is also provided in the embodiment of the telescoping assembly of FIG. 7. Anti-cocking bracket 72 maintains longitudinal alignment of tracks 20*a* and 20*b*, such that when track 20*b* is translated along axis A, the longitudinal centerlines of tracks 20*a* and 20*b* remain parallel and coaxial, and ensures that track 20*b* does not get out of alignment with the fixed track 20*a*.

Figure 8:
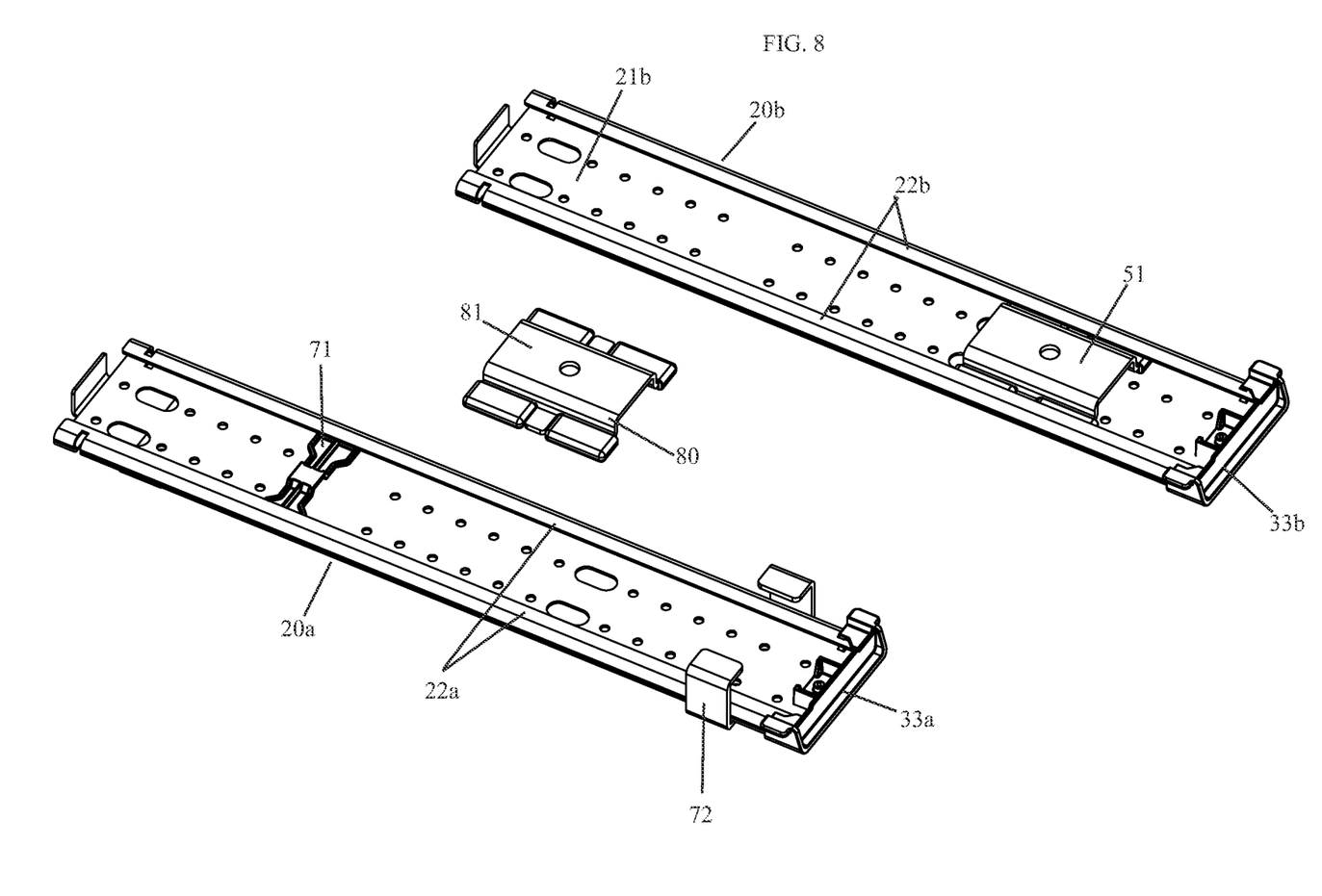
FIG. 8 is an exploded view showing the assembly of an alternate embodiment for a telescoping assembly for a CPU holder.

FIG. 8 shows an exploded view showing the assembly of an alternate embodiment for a telescoping assembly for a CPU holder. Like numerals will again be used to identify components previously identified in other figures. Thus, FIG. 8 again shows tracks 20*a* and 20*b*, optional stop member 71, track engagement member 51, end caps 33*a* and 33*b*, and anti-cocking bracket 72, as all have been described above. FIG. 8 clearly shows sliding engagement member 80. As shown in FIG. 8, sliding engagement member 80 is the same as track engagement member 51, however it serves a different purpose than track engagement member 51 does. Sliding engagement member 80 is received in the channel defined by channel forming members 22*a* of track 20*a*. Sliding engagement member 80 can slide in the aforementioned channel between optional stop member 71 and end cap 33*a*. Sliding engagement member 80 is secured to the underside of track 20*b*. That is, the opposite side of the illustrated base member surface 21*b* is mated with the top side 81 of sliding engagement member 80. When sliding engagement member 80 and attached track 20*b* slide in the aforementioned channel between optional stop member 71 and end cap 33*a*, track 20*b* translates along axis "A" shown in FIG. 7. During this translation, anti-cocking bracket 72 maintain longitudinal alignment of tracks 20*a* and 20*b*, thereby ensuring that sliding engagement member can slide freely in the channel defined by channel forming members 22*a*. Sliding engagement member 80 is secured to track 20*b* by fasteners (not shown). One of ordinary skill in the art will readily appreciate that sliding engagement member 80 can be secured to track 20*b* by any suitable means known in the art, including but not limited to, mechanical fasteners, adhesives or welding. Additionally, one of ordinary skill in the art will readily appreciate that providing sliding engagement member 80 and track engagement member 51 as having the same shape and geometry will simplify the manufacturing process because a single part can then be used interchangeably as either piece. However, this interchangability is not a requirement and in alternative embodiments the sliding engagement member 80 and track engagement member 51 may each have a different shape or geometry with respect to each other.

It will be appreciated by those of ordinary skill in the art that, while the forgoing disclosure has been set forth in connection with particular embodiments and examples, the disclosure is not intended to be necessarily so limited, and that numerous other embodiments, examples, uses, modifications and departures from the embodiments, examples and uses described herein are intended to be encompassed by the claims attached hereto. Various features of the disclosure are set forth in the following claims.

I claim:

1. A telescoping assembly comprising:
   a stationary track provided with at least hole mounting hole for securing the stationary track to the underside of a generally horizontal surface, said generally horizontal surface having an edge;
   a first sliding engagement member, adapted for insertion into the stationary track and for slidable engagement with the stationary track;
   a telescoping track having a first end and second end, said telescoping track adapted for engagement with the first sliding engagement member, wherein the first sliding engagement member is disposed between the stationary track and the telescoping track;
   a second sliding engagement member, adapted for insertion into and engagement with the telescoping track, wherein said second sliding engagement member is further adapted to engage with a CPU holder;
   a U-shaped anti-cocking bracket, adapted to maintain longitudinal alignment of the stationary track and the telescoping track; and
   wherein the first sliding engagement member and the telescoping track are adapted for translation along the stationary track from a retracted position to an extended position, and when the first sliding engagement member and the telescoping track is in the extended position, the second sliding engagement member and the CPU holder are in a position substantially past the edge of the generally horizontal surface, and a CPU retained in the CPU holder is positioned past the edge of the generally horizontal surface.

2. The telescoping assembly of claim 1 wherein the telescoping track further comprising a stop member at the first end of the telescoping track.

3. The telescoping assembly of claim 1 wherein the stationary track further comprises an optional stop member mounted on the stationary track.

4. The telescoping assembly of claim 1 wherein the telescoping track further comprises an end cap engaged with at least one end of the telescoping track.

5. The telescoping assembly of claim 4 wherein the end cap is removable.

6. The telescoping assembly of claim 1 wherein the stationary track and the telescoping track are identical pieces.

7. The telescoping assembly of claim 1 wherein the second sliding engagement member further comprises a track engagement member and a CPU holder engagement member, said track engagement member and said CPU holder engagement member joined for 360° rotation about a vertical axis therethrough.

8. The telescoping assembly of claim 7 wherein the track engagement member and the sliding engagement member are identical pieces.

9. The telescoping assembly of claim 1 wherein the stationary track and the telescoping track have a generally C-shaped cross-section.

10. The telescoping assembly of claim 1 wherein the stationary track and the telescoping track are formed from a material selected from the group consisting of steel, aluminum, other metals or plastics.

* * * * *